United States Patent [19]

DeMunn et al.

[11] 4,043,781
[45] Aug. 23, 1977

[54] METHOD FOR MAKING A BROWN PHOTOCHROMIC GLASS

[75] Inventors: Clark V. DeMunn; David J. Kerko; Ralph A. Westwig; David B. Wrisley, Jr., all of Corning, N.Y.

[73] Assignee: Corning Glass Works, Corning, N.Y.

[21] Appl. No.: 689,202

[22] Filed: May 24, 1976

Related U.S. Application Data

[63] Continuation-in-part of Ser. No. 520,249, Nov. 11, 1974, abandoned.

[51] Int. Cl.² ............... C03C 15/00; C03B 32/00; C03C 3/04; G02B 5/23
[52] U.S. Cl. ............................ 65/30 R; 65/33; 65/117; 65/DIG. 2; 106/DIG. 6; 106/53; 106/54; 350/160 P; 350/311; 351/163
[58] Field of Search ............ 65/30 R, DIG. 2, 33, 65/117; 106/54, DIG.2, 53; 351/163; 350/160 P, 311

[56] References Cited

U.S. PATENT DOCUMENTS

| 3,795,523 | 3/1974  | Moriya et al. ............ 65/DIG. 2 |
| 3,892,582 | 7/1975  | Simms ....................... 65/30 R |
| 3,920,463 | 11/1975 | Simms ..................... 65/DIG. 2 |
| 3,938,977 | 2/1976  | Gliemeroth ............... 65/30 R |
| 4,001,019 | 1/1977  | Yamashita et al. ............ 106/54 |

*Primary Examiner*—S. Leon Bashore
*Assistant Examiner*—Frank W. Miga
*Attorney, Agent, or Firm*—Kees van der Sterre; Clinton S. Janes, Jr.; Clarence R. Patty, Jr.

[57] ABSTRACT

A silver-halide photochromic glass of alkali-boroaluminosilicate base composition, having a brown coloration in the faded and darkened state, is provided by treating a potentially photochromic glass of specified composition according to a defined two-phase heat treatment to develop photochromic properties therein.

1 Claim, No Drawings

METHOD FOR MAKING A BROWN PHOTOCHROMIC GLASS

CROSS-REFERENCE TO RELATED APPLICATION

The present application is a continuation-in-part of our earlier-filed, copending, commonly-assigned application, Ser. No. 520,249, filed Nov. 11, 1974 now abandoned.

BACKGROUND OF THE INVENTION

Photochromic glasses, or phototropic glasses as they have been variously called, are glasses which darken under the influence of actinic radiation, normally ultraviolet radiation, and which return to the clear state when the actinic radiation is removed. U.S. Pat. No. 3,208,860, which is the basic patent in the field, describes a family of silicate glass compositions containing submicroscopic crystals of a silver halide dispersed throughout the glassy matrix, which crystals are reversibly darkenable under the action of ultraviolet radiation, imparting to the glass the characteristic of variable light transmission depending upon the amount of ultraviolet radiation present in radiation incident thereupon.

U.S. Pat. No. 3,197,296 describes alkali boroaluminosilicate glasses containing submicroscopic silver halide crystals which exhibit properties which are very desirable for ophthalmic applications. Hence the glasses described in that patent have refractive indices ($n_D$) within the range of about 1.52–1.54, exhibit the desired degree of darkenability to be useful in ophthalmic thicknesses (about 2 millimeters), and demonstrate darkening and fading rates which are acceptable for ophthalmic lenses.

Most presently-available photochromic glasses utilized for ophthalmic and other applications exhibit a neutral gray color in the faded or unactivated state, and assume a darker but still neutral gray coloration upon activation with ultraviolet radiation. The color of these glasses is a function of the composition utilized to produce the photochromic glass, and of the thermal treatment utilized to convert the potentially-photochromic glass as formed into a photochromic article exhibiting the desired sensitivity to ultraviolet light.

Whereas prior art photochromic glasses for ophthalmic and other uses have been widely available in a gray coloration in the darkened and faded state, a demand for photochromic glasses of equivalent sensitivity and behavior, but exhibiting other colorations such as brown, has recently developed.

One method of modifying color in photochromic glasses comprises adding colorants to the base glass which are compatible with the photochromic constituents present therein. German Offenlegungsschrift No. 2,107,343, for example, described photochromic glasses containing additions of vanadium, chromium, manganese, and cobalt, which glasses exhibit a variety of colors in combination with photochromic properties. The use of colorants, however, necessitates changes in glass batch composition whenever a color modification is required, and the additives required to produce particular colors may add substantially to the cost of the batch.

It has also been proposed to subject photochromic glass of the silver halide type to "aftertreatments" which are designed to modify the color of the glass without substantial degradation of the photochromic properties thereof. Thus, U.S. Pats. Nos. 3,892,582 and 3,920,463 describe aftertreatments for already completely developed photochromic glasses wherein the glasses (containing microscopic particles of silver halide) are heated in a reducing atmosphere to impart yellow or brown coloration thereto. The need for supplemental treatments, however, can also add substantially to the cost of the photochromic product.

Thus there still exists a need for a simple, low-cost method for producing brown photochromic glass.

SUMMARY OF THE INVENTION

We have now discovered that potentially photochromic glass compositions of the kind similar to those compositions utilized in the prior art to produce gray photochromic glasses can be treated according to a specific time-temperature heat treatment to provide photochromic glasses exhibiting the desired brown coloration. The active crystal phase exhibiting ultraviolet sensitivity in these glasses is a silver halide, just as is the case with the gray photochromic glasses; however, a darkened and faded color which may be broadly characterized as brown rather than gray is observed in the photochromic product. This coloration is attributed primarily to effects of the modified heat treating procedure on the development of photochromic crystal phases in the glass, although glass composition also has an effect on color, particularly in the faded state.

In general, the method of the present invention differs from prior art methods in that a two-phase heat treatment is required. This treatment comprises the step of maintaining the potentially photochromic glass being treated in a temperature range below peak silver halide crystal growth temperatures for a specified period of time, and thereafter maintaining the article at temperatures in the temperature range of rapid silver halide growth to complete the development of the active silver halide phase. This procedure is believed to modify the number and size of the silver halide particles produced in the glass during heat treatment in a manner which affects the faded and darkened color of the glass.

The method of the invention is effective to produce brown photochromic glasses without the need for introducing colorants into the glass. However, the brown coloration can be modified or intensified through the use of conventional glass colorants if desired. Suitable colorants for this purpose are the transition metal colorants nickel, cobalt, and manganese.

DETAILED DESCRIPTION

Among the glass compositions which may be successfully treated in accordance with the present invention are those consisting essentially, in weight percent, of about 53–60% $SiO_2$, 8–10% $Al_2O_3$, 15–18% $B_2O_3$, 1–3% $Na_2O$, 1.5–3.2% $Li_2O$, 5–9% $BaO$, 3.5–7.0% $PbO$, 0–4% $ZrO_2$, 0.012–0.040% $CuO$, 0.14–0.22% $Ag$, 0.22–0.36% $Cl$, 0.10–0.20% $Br$, and 0–1% $F$.

The glasses may be prepared by melting glass batches of appropriate composition in pots, tanks, crucibles or the like at temperatures in the range of about 1400°–1500° C., utilizing conventional glass melting procedures. The batch ingredients may comprise any constituents, whether oxides or other compounds, which are converted to the above silver, oxide, and halogen composition components at the temperatures utilized for melting the batch. Preferably the batch constituents are ball-milled together prior to melting to aid in securing a homogeneous glass.

Glass melts prepared as described may be formed into glass articles of the required configuration by pressing, casting, drawing, rolling, or other conventional glass forming procedures while simultaneously cooling the melt below the transformation range of the glass. The articles thus produced may then be cooled to room temperature, or first annealed at temperatures in the 400°–480° C. range, if desired.

Glass articles produced as above described are referred to as potentially-photochromic articles in that they contain dissolved silver and halogen constituents which are not light-sensitive, but which are capable of being precipitated from the glass as light sensitive silver halide crystallites through the use of an appropriate heat treatment. These potentially photochromic articles are not generally photochromic as formed, since they do not contain developed silver halide crystallites which can interact with ultraviolet light. Moreover, when melted and cooled under normal conditions, the glasses are typically essentially colorless, the desired brown coloration being developed only subsequently, through controlled heat treatment of the potentially photochromic glass.

In accordance with the present invention, potentially photochromic glasses produced as above described are rendered photochromic by subjecting them to a heat treatment comprising heating the article to a temperature in the range of about 520°–580° C., maintaining the article at temperatures in that range for a time in the range of about 2–30 minutes, preferably 2–15 minutes, thereafter further heating the article to a temperature in the range of about 600°–660° C., maintaining the article at temperatures in that range for a time in the range of about 5–60 minutes, preferably 5–30 minutes, and finally cooling the article to room temperature.

Photochromic articles produced in accordance with the above-described process in general exhibit a coloration which may be characterized as brown rather than gray. The range of coloration may be precisely specified in terms of the 1931 C.I.E. trichromatic colorimetric coordinate system which is fully described by A. C. Hardy in the *Handbook of Colorimetry*, Technology Press, M.I.T., Cambridge, Mass. (1936). A glass produced in accordance with our invention has a chromaticity in 2.00 millimeter thickness such that light transmitted through the glass from a specified source (Illuminant C) has a color coordinate $x$ in the range of about 0.3100–0.3700 and a color coordinate $y$ in the range of about 0.3150–0.3600 on the C.I.E. chromaticity diagram. This chromaticity is exhibited irrespective of whether the glass is in the darkened, faded, or intermediate photochromic state. Because the perception of color is subjective, the individual observer may characterize colors in this region as red-brown, golden-brown, or green-brown, depending upon glass composition and/or heat treatment. However, the determination of whether the chromaticity of a particular glass falls within the above-defined chromaticity region is objective, and all such glasses are broadly characterized as having a brown coloration for the purposes of the present description.

The invention may be further understood by reference to the following detailed example.

EXAMPLE

A glass article composed of a potentially photochromic glass having an as analyzed composition, in parts by weight, of about 55 parts $SiO_2$, 9 parts $Al_2O_3$, 16 parts $B_2O_3$, 2 parts $Na_2O$, 3 parts $Li_2O$, 5 parts PbO, 7 parts BaO, 2 parts $ZrO_2$, 0.035 parts CuO, 0.15 parts Ag, 0.30 parts Cl, 0.15 parts Br, and 0.2 parts F is provided.

This article is placed in an electrically-heated furnace, heated at a rate of about 20° C. per minute to a temperature of 550° C., maintained at 550° C. for 10 minutes; further heated at a rate of about 20° C. per minute to a temperature of about 620° C., maintained at 620° C. for 20 minutes, and finally cooled to room temperature over a time interval of about an hour and removed from the furnace.

After heat treatment, the article is ground and polished to provide a sample 2.00 millimeters in thickness, having plane parallel surfaces, which is tested for color and photochromic properties. This sample has a light-tan color in the faded state and a faded visible light transmission of about 90%. Upon darkening for 20 minutes utilizing a blacklight blue fluorescent ultraviolet light source, the glass sample has a dark brown color and a darkened visible light transmission of about 50%. The darkened glass has a chromaticity (Illuminant C) of $x = .3250$ and $y = .3200$ on the C.I.E. chromaticity diagram.

The present invention offers substantial advantages over prior art processes for producing brown photochromic glass. First, as previously noted, no added colorants need be employed, and thus a single glass composition may be utilized to produce both gray and brown photochromic glasses.

Secondly, the coloration effect obtained in accordance with the invention is a bulk effect such that the entire volume of treated glass exhibits a brown color. Prior art coloring processes utilizing supplemental aftertreatments in a reducing atmosphere provide predominantly surface coloration, such that grinding and polishing can remove or substantially reduce the color imparted by the treatment. Thus these treatments are useful principally for essentially finished glass articles, whereas the present process produces bulk colored glass which is fully amenable to further treatment.

And, finally, the process of the present invention avoids the need for costly batch additions and supplemental heat treatments.

The criticality of heat treatment in providing brown photochromic glass in accordance with the invention as hereinabove described is illustrated by the following comparative example.

COMPARATIVE EXAMPLE

A glass article composed of a potentially photochromic glass having an analyzed composition, in parts by weight, of about 55 parts $SiO_2$, 16 parts $B_2O_3$, 9 parts $Al_2O_3$, 2 parts $Na_2O$, 3 parts $Li_2O$, 5 parts PbO, 7 parts BaO, 2 parts $ZrO_2$, 0.036 parts CuO, 0.16 parts Ag, 0.27 parts Cl, 0.15 parts Br, and 0.2 parts F is provided.

This article is placed in a furnace, heated at a rate of about 200° C. per minute to about 600° C., maintained at 600° C. for about 20 minutes, and finally gradually cooled to room temperature.

A glass article heat treated as described is fully photochromic following treatment, exhibiting a light transmittance in the faded state, in 2 millimeter cross-section, of about 90%, and exhibiting a light transmittance in the darkened state of about 50%. However, the glass will exhibit a gray rather than a brown coloration in the faded and darkened state. Hence, the glass will have a chromaticity (Illuminant C) such that component $x$ is less than or equal to about 0.3010 and component $y$ is less than or equal to about 0.3040 on the C.I.E. chromaticity diagram.

It will be recognized that numerous variations and modifications may be undertaken within the scope of the invention as hereinabove described. For example, in heat treating the potentially photochromic glass it may not be necessary to resort to specific holding times at temperatures in the lower 520°–580° C. or upper 600°–660° C. temperature ranges. Rather, the article may be continuously heated and/or cooled as it is passing through these ranges, provided that sufficient times in these ranges are provided by the heating and cooling rates employed.

Of course, it is also possible to vary the concentrations of composition constituents and/or to incorporate conventional colorants into the glass compositions during the manufacturing process in order to intensity or modify the brown coloration produced within the chromaticity limitations hereinabove set forth. Suitable colorants for this purpose include the transition metal colorants such as cobalt, nickel, and manganese. NiO is a particularly preferred colorant for enhancing the brown coloration while at the same time reducing the faded transmittance of the photochromic glass. It will be recognized from the foregoing examples, however, that neither these nor any other colorants comprise essential constituents of brown photochromic glasses provided in accordance with the invention.

Whereas the optimum heat treatments to be employed to obtain the most desired brown coloration will depend upon the particular glass composition selected within the above-described composition limitations, these composition and heat treatment variables can readily be determined through routine experimentation by one skilled in the photochromic glass art.

We claim:
1. A method for making a photochromic glass article having a brown coloration in the faded and darkened state which comprises
 a. providing a potentially photochromic glass article having a composition consisting essentially, in weight percent, of about 53–60% $SiO_2$, 8–10% $Al_2O_3$, 15–18% $B_2O_3$, 1–3% $Na_2O$, 1.5–3.2% $Li_2O$, 5–9% BaO, 3.5–7% PbO, 0–4% $ZrO_2$, 0.012–0.040% CuO, 0.14–0.22% Ag, 0.22–0.36% Cl, 0.10–0.20% Br and 0–1% F;
 b. heating the potentially photochromic glass article to a temperature in the temperature range of about 520°–580° C., and maintaining the article in that temperature range for a time of about 2–30 minutes;
 c. further heating the potentially photochromic glass article to a temperature in the temperature range of about 600°–660° C. and maintaining the article in that temperature range for a time of about 5–60 minutes; and
 d. cooling the article to room temperature; said brown coloration resulting from said method being present throughout the entire volume of said photochromic glass article.

* * * * *